US012025949B2

(12) United States Patent
Nakabo

(10) Patent No.: US 12,025,949 B2

(45) Date of Patent: Jul. 2, 2024

(54) SHEET COOLING APPARATUS AND IMAGE FORMING APPARATUS

(71) Applicant: KONICA MINOLTA, INC., Tokyo (JP)

(72) Inventor: Masashi Nakabo, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/213,050

(22) Filed: Jun. 22, 2023

(65) Prior Publication Data

US 2024/0012359 A1 Jan. 11, 2024

(30) Foreign Application Priority Data

Jul. 7, 2022 (JP) ................................ 2022-109680

(51) Int. Cl.

*G03G 21/20* (2006.01)
*G03G 15/00* (2006.01)
*G03G 15/20* (2006.01)

(52) U.S. Cl.

CPC ....... *G03G 21/206* (2013.01); *G03G 15/2003* (2013.01); *G03G 15/6502* (2013.01); *G03G 2221/1645* (2013.01)

(58) Field of Classification Search

CPC ............ G03G 21/206; G03G 15/2003; G03G 15/6502; G03G 15/6538; G03G 2221/1645

See application file for complete search history.

(56) References Cited

U.S. PATENT DOCUMENTS

2018/0341217 A1* 11/2018 Nishioka ............. G03G 21/206
2020/0223652 A1* 7/2020 Morita ................ G03G 21/206

FOREIGN PATENT DOCUMENTS

JP 2010-266799 A 11/2010
JP 2021-050050 A 4/2021

* cited by examiner

*Primary Examiner* — Sandra Brase

(74) *Attorney, Agent, or Firm* — Squire Patton Boggs (US) LLP

(57) ABSTRACT

A sheet cooling apparatus includes: a fixing device that fixes a toner image on a sheet; an ejection section that ejects the sheet on which the toner image has been fixed; a stacking section that stacks the sheet ejected by the ejection section; an air blowing device that blows air; a first air blowing path that guides the air from the air blowing device so that the air passes through the ejection section; and a second air blowing path that guides the air so as to suppress inflow of the air into the stacking section in a state where the first air blowing path is blocked by the sheet ejected by the ejection section.

7 Claims, 5 Drawing Sheets

SHEET COOLING APPARATUS AND IMAGE FORMING APPARATUS

CROSS-REFERENCE TO RELATED APPLICATION

The entire disclosure of Japanese Patent Application No. 2022-109680 filed on Jul. 7, 2022, including description, claims, drawings, and abstract, is incorporated herein by reference in its entirety.

BACKGROUND

1. Technological Field

The present invention relates to a sheet cooling apparatus that cools a sheet, such as a print sheet, on which a toner image has been fixed by a fixing device in an image forming apparatus, when the sheet is ejected, and to the image forming apparatus.

2. Description of the Related Art

An electrophotographic image forming apparatus such as a multifunction peripheral (MFP) includes a fixing device for fixing a toner image transferred onto a sheet such as a print sheet. The fixing device performs a heating process and a pressing process on the sheet onto which the toner image has been transferred, thereby fixing the image on the sheet. Then, the image forming apparatus ejects the sheet on which the toner image has been fixed to a sheet stacking section through an ejection section.

An image forming apparatus such as an MFP generally has a configuration in which a scanner unit is provided at an upper part of an apparatus body and a printer unit is provided at a central part of the apparatus body. The sheet stacking section is disposed in a space between the scanner unit and the printer unit. Thus, the sheet stacking section is arranged in a closed space of which four sides including an upper side, a lower side, a far side, and a sheet ejection side are closed. Therefore, a sheet stacking space, which is an upper space of the sheet stacking section, tends to be in a high temperature state.

When the sheet ejected to the sheet stacking section is exposed to a high-temperature atmosphere, the toner is melted. Then, a tacking phenomenon occurs in which the two sheets continuously ejected stick to each other. In particular, in recent years, there has been a tendency to lower a fixing temperature by lowering a melting point of a toner so as to achieve energy saving of an image forming apparatus. For this reason, there is a high possibility that the tacking phenomenon frequently occurs as the melting point of the toner is lowered.

Conventionally, in order to prevent the tacking phenomenon as described above, a technology for cooling a sheet stacking space has been proposed (e.g., Japanese Unexamined Patent Application Publication (JP-A) Nos. 2021-050050 and 2010-266799). JP-A No. 2021-050050 discloses a configuration including a cooling unit that blows cooling air from a cooling fan attached to an apparatus body to an upper surface of a sheet ejected to a stacking section. In addition, JP-A No. 2010-266799 discloses a configuration in which a discharge port for air guided by an air blowing unit includes an opening toward a stacking section and an opening toward a sheet ejection conveyance path.

However, with the configuration as in JP-A No. 2021-050050 in which air is blown to the upper surface, the ejected sheet receives a pressure greater than or equal to its own weight, and the tacking prevention performance becomes worse as the number of stacked sheets increases. In addition, since the air is blown to the upper surface, there is a problem of a stacking failure that the ejected sheet easily hangs down and the sheet is curled in the stacking section.

Furthermore, with the configuration as in JP-A No. 2010-266799 in which air is made to flow to the stacking section, there is a problem that, when a sheet interval becomes short in a high-speed machine or the like, a next sheet blocks an end of the sheet ejection conveyance path, and air starts to flow to the stacking section before the sheet reaches a sheet ejection tray, thus causing a stacking failure.

SUMMARY

An object of the present invention is to provide a sheet cooling apparatus and an image forming apparatus capable of preventing deterioration of tacking prevention performance and a stacking failure.

A first aspect of the present invention relates to a sheet cooling apparatus including:

a fixing device, that fixes a toner image on a sheet;

an ejection section that ejects the sheet on which the toner image s been fixed by the fixing device;

a stacking section that stacks the sheet ejected by the ejection section;

an air blowing device that blows air;

a first air blowing path that guides the air rom the air blowing device so that the air passes through the ejection section; and a second air blowing path that guides the air so as to suppress inflow of the air into the stacking section in a state where the first air blowing path is blocked by the sheet ejected by the ejection section.

A second aspect of the present invention relates to an image forming apparatus including a sheet cooling apparatus, the sheet cooling apparatus including:

a fixing device that fixes a toner image on a sheet;

an ejection section that ejects the sheet on which the toner image has been fixed by the fixing device;

a stacking section that stacks the sheet ejected by the ejection section;

an air blowing device that blows air;

a first air blowing path that guides the air from the air blowing device so that the air passes through the ejection section; and a second air blowing path that guides the air so as to suppress inflow of the air into the stacking section in a state where the first air blowing path is blocked by the sheet ejected by the ejection section.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 59 is a sectional view of the sheet ejection section and the IOW/CT part thereof in a state where a sheet is being ejected;

DETAILED DESCRIPTION OF EMBODIMENTS

Hereinafter, one or more embodiments of the present invention will be described with reference to the drawings. However, the scope of the invention is not limited to the disclosed embodiments.

Hereinafter, an embodiment of the present invention will be described with reference to the drawings.

Figure 1:
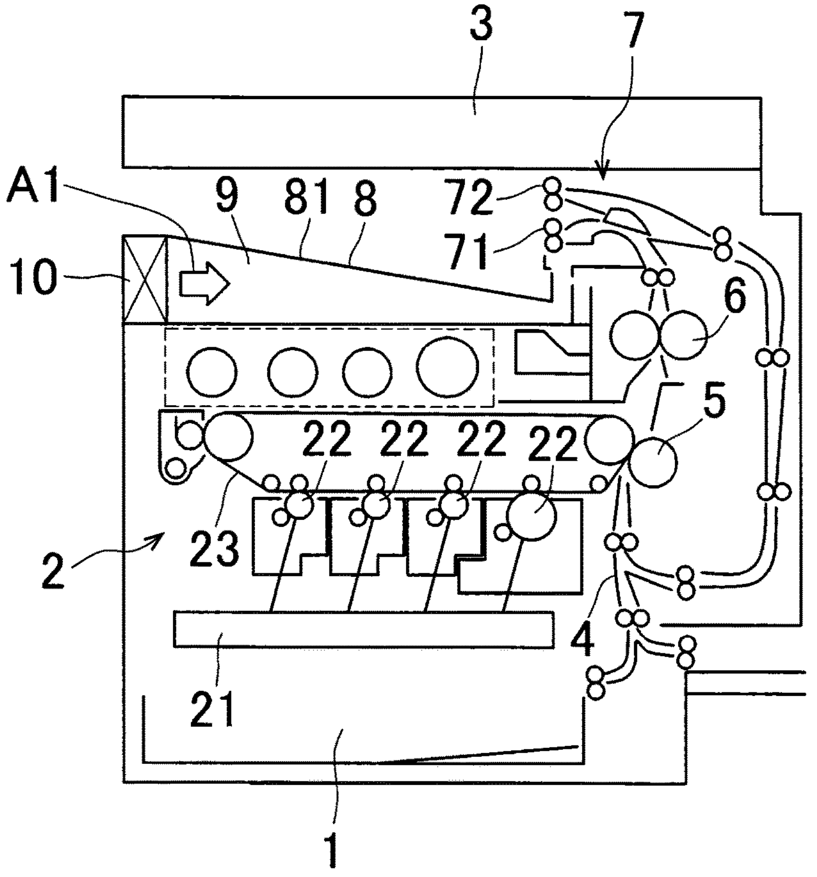
FIG. 1 is a schematic diagram illustrating a configuration of a tandem-type color printer as an example of an image forming apparatus including a sheet cooling apparatus according to an embodiment of the present invention.

FIG. 1 is a schematic diagram illustrating a configuration of a tandem-type color printer as an example of an image forming apparatus including a sheet cooling apparatus according to the embodiment of the present invention.

The image forming apparatus includes a sheet feed tray 1 at the bottom, a printer unit 2 above the sheet feed tray 1, and a scanner unit 3 as a document reader at the top.

The printer unit 2 prints image data read by the scanner unit 3 or print data transmitted from a terminal device (not illustrated) on a sheet of paper as an example of a sheet. Specifically, toner images of respective colors formed on four photosensitive drums 22 by being exposed by an exposure device 21 are superimposed on an intermediate transfer belt 23, and the superimposed toner image is transferred by a secondary transfer roller 5 onto the sheet conveyed from the sheet feed tray 1 through a conveyance path 4.

The sheet on which the toner image has been formed is conveyed to a fixing device 6, and is heated and pressed by the fixing device 6 to fix the toner image on the sheet. The sheet on which the toner image has been fixed is sent to a sheet ejection section 7, and is ejected to a sheet ejection tray 81 formed on an upper surface of a stacking section. 8 by a sheet ejection roller pair 71 of the sheet ejection section 7 with the toner-image-formed surface facing downward. In a case where the number of sheets to be printed is two or more, the above-described processing is continuously performed, and the sheets are continuously ejected from the sheet ejection section 7 to the sheet ejection tray 81 and are sequentially stacked on the stacking section 8.

Figure 5A:
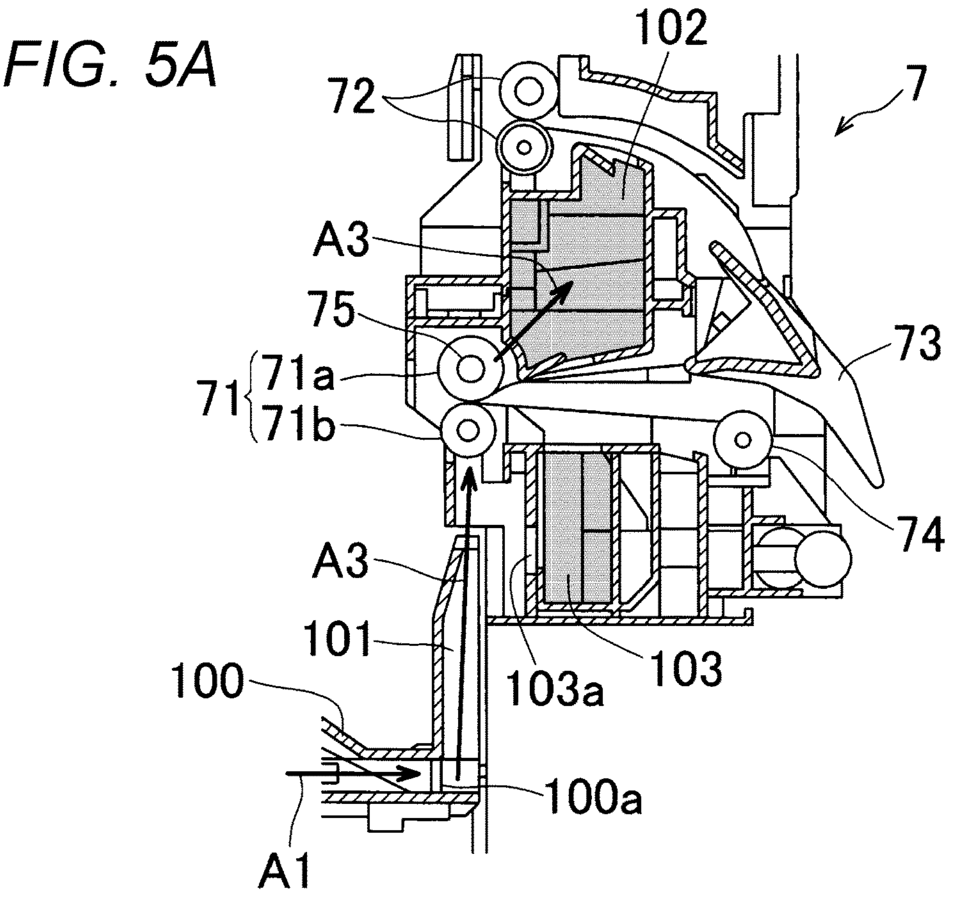
FIG. 5A is a sectional view of the sheet ejection section and a lower part thereof in a state where no sheet to be ejected exists.
Figure 5B:
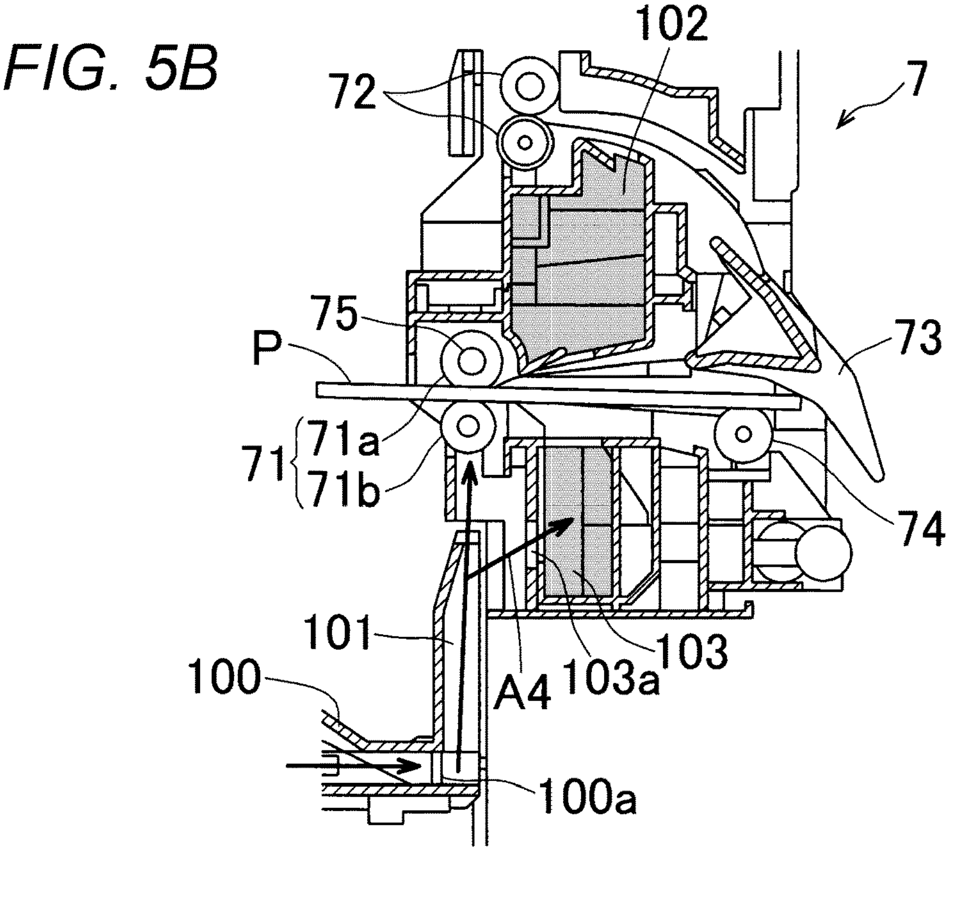
Figure 6:
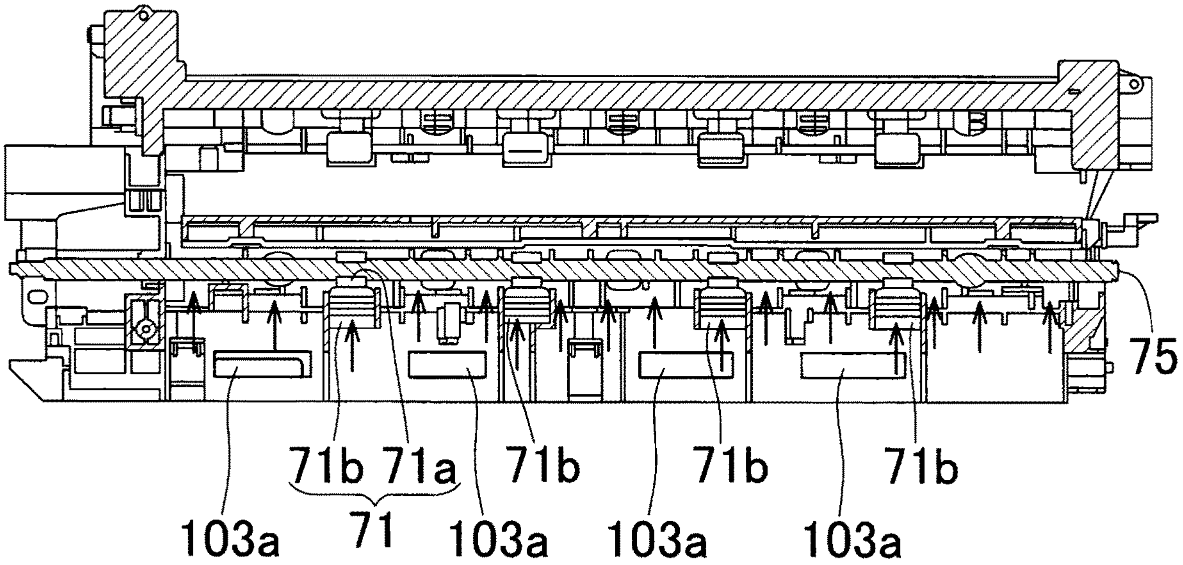
FIG. 6 is a sectional view of the sheet ejection section in a longitudinal direction thereof.

As illustrated in FIGS. 5A, 5B and 6, the sheet ejection roller pair 71 includes a driving roller 71*a* mounted on an upper drive shaft 75 and a plurality of sheet ejection driven rollers 71*b* for supporting a sheet. The sheet ejection driven rollers 71*b* are disposed at an interval in an axial direction of the driving roller 71*a* so as to be in contact with the driving roller 71*a* on the lower side. Note that in FIG. 1, a roller pair 72 above the sheet ejection roller pair 71 is a reverse roller pair for reversing the sheet in a case of duplex copying.

A hollow portion 9 is formed inside a lower portion of the stacking section 8, and an air blower fan 10 which is an air blowing unit is mounted on an end portion of the hollow portion 9 on a side opposite to the sheet ejection section 7. Cooling air taken in from the outside of the apparatus by the air blower fan 10 is sent to a sheet ejection section 7 side through the hollow portion 9 below the stacking section 8 as indicated by an arrow A1 in FIG. 1.

Figure 2:
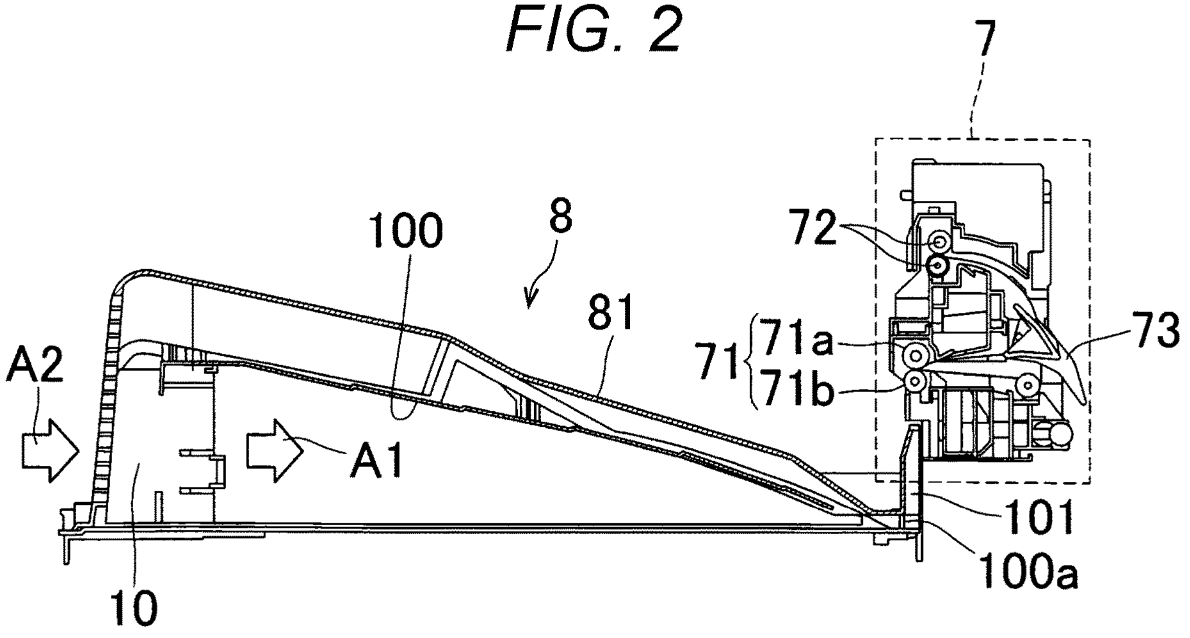
FIG. 2 is a longitudinal sectional view of a stacking section and a sheet ejection section as viewed from a front side.
Figure 3:
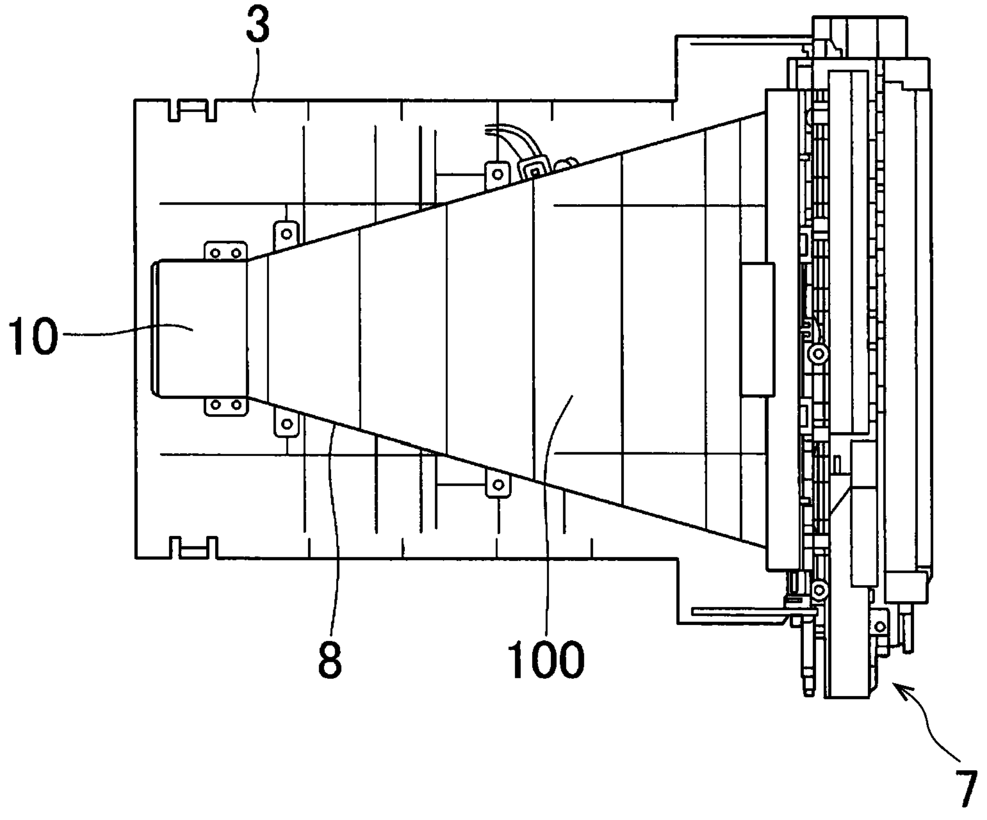
FIG. 3 is a view of the stacking section and the sheet ejection section as viewed from a bottom surface side.
Figure 4A:
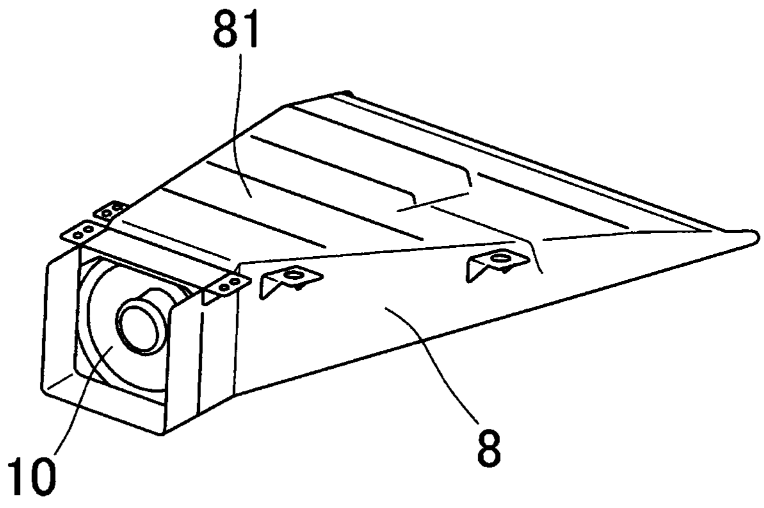
FIG. 4A is a perspective view of the stacking section as viewed from an air blower fan side.

FIG. 2 is a longitudinal sectional view of the stacking section 8 and the sheet ejection section 7 as viewed from a front side. FIG. 3 is a view of the stacking section 8 and the sheet ejection section 7 as viewed from a bottom surface side. FIG. 4A is a perspective view of the stacking section 8 as viewed from an air blower fan 10 side, and FIG. 4B is a perspective view of the stacking section 8 when the air blower fan 10 side is viewed with the top and bottom reversed.

Figure 4B:
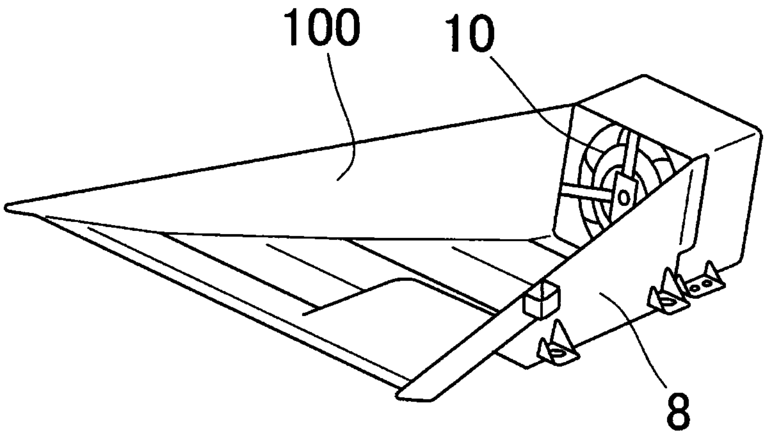
FIG. 4B is a perspective view of the stacking section when the air blower fan side is viewed with the top and bottom reversed.

As illustrated in FIGS. 4A and 4B, the stacking section 8 is formed in an inverted dish shape of which a bottom portion is open in a cross section. The stacking section 8 is connected to the image forming apparatus at a plurality of positions, so that a duct 100 having the hollow portion 9 is formed on a hack side of the stacking section 8 as illustrated in FIGS. 2 and 3. The height of the stacking section 8 is high on the air blower fan 10 side and continuously decreases toward the sheet ejection section 7 side. With this configuration, the sheet ejection tray 81 is formed as an inclined surface having a high position on the air blower fan 10 side and a low position on the sheet ejection section 7 side. As illustrated in FIGS. 3, 4A, and 4B, the air blower fan 10 is disposed at a central part of the stacking section 8 in a front-rear direction (a vertical direction in FIG. 3). The length of the stacking section 8 in the front-rear direction increases as the stacking section 8 extends from the air blower fan 10 to the sheet ejection section 7 side. The end portion on the ejection section 7 side is formed to have substantially the same length as a sheet passage width of the sheet ejection section 7.

As illustrated in FIG. 2, a duct outlet 100*a* inside the stacking section 8 is erected toward the sheet ejection section 7. Furthermore, the duet outlet 100*a* communicates with a lower end of a vertical air flow portion 101 that extends in the axial direction of the sheet ejection roller pair 71. On the other hand, an upper end of the vertical air flow portion 101 is open at a position immediately below the sheet ejection roller pair 71. Therefore, as indicated by an arrow A2 in FIG. 2, air taken into the duct 100 of the stacking section 8 from the outside of the image forming apparatus by the air blower fan 10 is fed toward the duct outlet 100*a* in the duct 100 as indicated by the arrow A1. Furthermore, the air flows into a lower portion of the vertical air flow portion 101 from the duct outlet 100*a*, moves upward through the vertical air flow portion 101, and flows to the sheet ejection roller pair 71 and the periphery thereof. The air comes into contact with the sheet ejection driven rollers 71*b* on a lower side of the sheet ejection roller pair 71 and directly cools the sheet ejection driven rollers 71*b*.

As described above, in the present embodiment, the air blower fan 10 is mounted on the stacking section 8, and the air blown by the air blower fan 10 passes below the stacking section 8 and is guided to the sheet ejection, roller pair 71. Therefore, an air supply path is formed compactly by using the stacking section 8.

FIG. 5A is a sectional view of the sheet ejection section 7 and a lower part thereof in a state where no sheet to be ejected exists. FIG. 5B is a sectional view of the sheet ejection section 7 and the lower part thereof in a state where a sheet is being ejected.

As illustrated in FIGS. 5A and 5B, the sheet ejection section 7 has an upper suction area 102 at a position obliquely above the sheet ejection roller pair 71 on an upstream side in a sheet conveyance direction. The upper suction area 102 is long in a longitudinal direction of the sheet ejection roller pair 71 (a thickness direction of the paper surface of FIGS. 5A and 58). The upper suction area 102 communicates with a space in which the sheet ejection roller pair 71 is disposed. Note that, the cross section of the upper suction area 102 is illustrated in gray in FIGS. 5A and 5B.

On the other hand, below the upper suction area 102 with a sheet conveyance path in between, a lower suction area 103 is formed in parallel, with the upper suction area 102. In FIGS. 5A and 5B, the cross section of the lower suction area 103 is also illustrated in gray similarly to the upper suction area 102. The lower suction area 103 is formed at a position opposite to the stacking section 8 with respect to the vertical air flow portion 101. As illustrated in FIGS. 5A, and 6, a plurality of openings 103*a* are formed along a longitudinal direction of the lower suction area 103 on a side wall of the lower suction area 103 on a vertical air flow portion 101 side. The lower suction area 103 communicates with the vertical air flow portion 101 through the openings 103*a*. The air moving upward through the vertical air flow portion 101 is able to flow into the lower suction area 103 through the openings 103*a*.

Note that in FIG. 5B, a sheet P is a sheet being ejected by the sheet ejection roller pair 71. Referring to FIGS. 5A and 5B, a switching claw 73 switches between conveyance of the sheet P to the sheet ejection roller pair 71 and conveyance of the sheet P to the reverse roller pair 72. A conveyance roller 74 conveys the sheet P to the sheet ejection roller pair 71.

Figure 7:
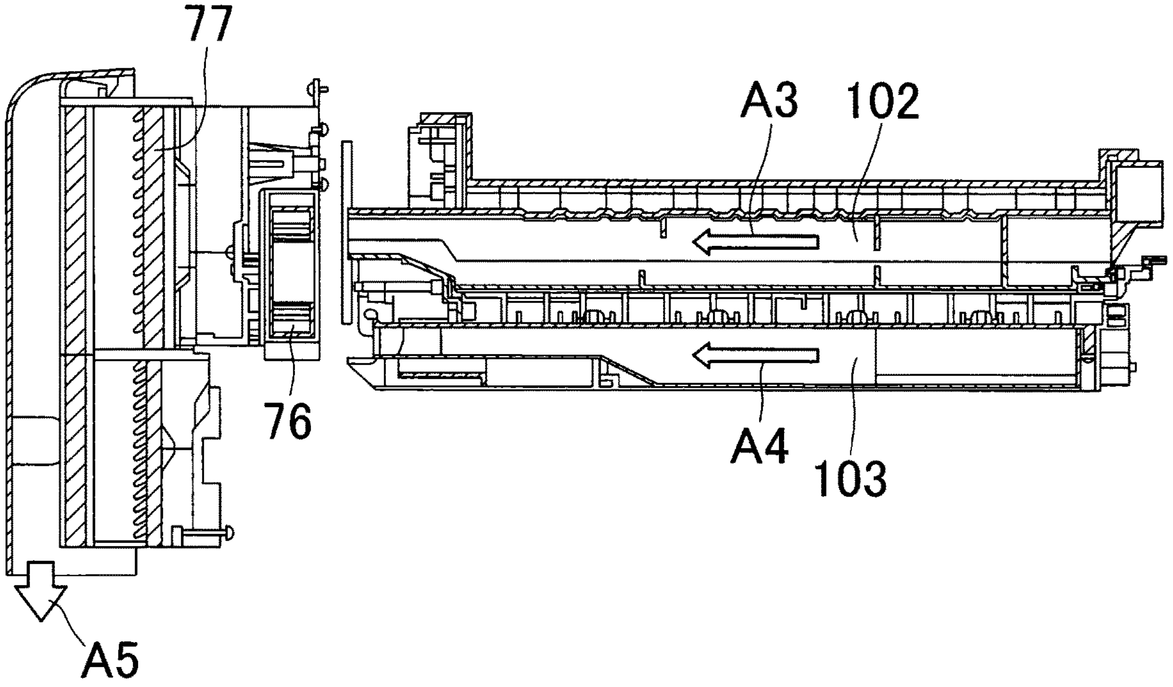
FIG. 7 is a sectional view illustrating an upper suction area and a flow path of air flowing into the upper suction area.

As illustrated in FIG. 7, a suction fan 76 is mounted at a position on a far side of the upper suction area 102 and the lower suction area 103 (on a far side in the front-rear direction of the image forming apparatus) so as to be capable of suctioning air in the upper suction area 102 and the lower suction area 103. A filter 77 is disposed downstream from the suction fan 76. The air in the upper suction area 102 and the lower suction area 103 sucked by the suction fan 76 passes through the filter 77 where dirt, dust, and the like in the air are removed. Thereafter, the air is ejected to the outside of the apparatus as indicated by an arrow A5 in FIG. 7.

Due to the presence of the air blower fan 10, the duct 100, the vertical air flow portion 101, the upper suction area 102, the lower suction area 103, the suction fan 76, and the like, two air blowing paths of a first air blowing path and a second air blowing path are formed as air blowing paths for air flowing into the vertical air flow portion 101 from the duct 100 of the stacking section 8. The first air blowing path is an air blowing path in which the air flowing from the duct outlet 100*a* into the vertical air flow portion 101 and moving upward through the vertical air flow portion 101 to the sheet ejection roller pair 71 passes through the sheet ejection roller pair 71 and a portion in the vicinity of the sheet ejection roller pair 71, and flows to the upper suction area 102 as indicated by an arrow A3 in FIG. 5A. The air is sucked and collected by the suction fan 76.

As illustrated by an arrow A4 in FIG. 5B, the second air blowing path is an air blowing path in which the air moving upward through the vertical air flow portion 101 flows to the lower suction area 103 through the openings 103*a*. The air is sucked and collected by the suction fan 76.

Next, an operation of the image forming apparatus illustrated in FIG. 1 during sheet cooling will be described.

The sheet P on which the toner image has been fixed by the fixing device 6 is conveyed to the sheet ejection roller pair 71 by the conveyance roller 74 and the like and is ejected to the sheet ejection tray 81 by the sheet ejection roller pair 71. In a case where a plurality of sheets P are printed, the plurality of sheets P are sequentially ejected to the sheet ejection tray 81 and stacked in the stacking section 8.

On the other hand, fresh air is taken in from the outside of the image forming apparatus by the air blower fan 10 disposed at one end portion of the stacking section 8. The taken-in air is sent toward the duct outlet 100*a* at the other end portion in the duct 100 of the stacking section 8, and flows into the vertical air flow portion 101 from the duct outlet 100*a*.

Due to a feed pressure of the air blower fan 10 and a suction force of the suction fan 76 disposed at the far-side end portions of the upper suction area 102 and the lower suction area 103, the air flowing into the vertical air flow portion 101 moves upward through the vertical air flow portion 101.

In a state where the sheet P on which an image has been formed is not conveyed to the sheet ejection roller pair 71, the air flows along the first air blowing path indicated by the arrow A3 in FIG. 5A. That is, the air moving upward through the vertical air flow portion 101 comes into direct contact with the sheet ejection driven rollers 71*b* on the lower side of the sheet ejection roller pair 71, passes through the sheet ejection roller pair 71 and the portion in the vicinity of the sheet ejection roller pair 71, and cools the sheet ejection roller pair 71 and the conveyance path in the vicinity thereof. Thereafter, the air lows into the upper suction area 102 and moves through the upper suction area 102 toward the suction fan 76. Thereafter, the air passes through the filter 77 and is ejected to the outside of the apparatus in a clean state in which dirt, dust, and the like in the air are removed. That is, when the sheet P on which an image has been formed is not conveyed, the air exhibits a function of cooling the sheet ejection roller pair 71 and the portion in the vicinity of the sheet ejection roller pair 71 while passing through the first air blowing path. Therefore, the sheet P subsequently passing through the sheet ejection roller pair 71 is cooled by the sheet ejection roller pair 71 and the like.

On the other hand, when the sheet P on which an image has been formed is conveyed and ejected by the sheet ejection roller pair 71, the air flowing into the vertical air flow portion 101 from the duet outlet 100*a* moves upward through the vertical air flow portion 101 and comes into contact with the sheet ejection driven rollers 711) of the sheet ejection roller pair 71 and the lower surface of the sheet P to cool the sheet. However, the upward movement of the air passing through the sheet ejection roller pair 71 is blocked by the sheet P. Therefore, since an internal pressure of the air flow path increases, the air flows into the lower suction area 103 through the openings 103*a* along the second air blowing path indicated by the arrow A4 in FIG. 5B. Thereafter, the air moves through the lower suction area 103 to the suction fan side, passes through the filter 77, and is ejected to the outside of the apparatus. That is, when the sheet P on which an image has been formed is ejected, the air exhibits the function of cooling the sheet while passing through the second air blowing path.

As described above, in the present embodiment, the second air blowing path is formed in addition to the first air blowing path. Therefore, even when the flow of the air through the first air blowing path is blocked by the sheet P present in the sheet ejection roller pair 71 and the internal pressure of the air flow path is increased, the air flows into the lower suction area 103 through, as an escape route, the openings 103*a* of the second air blowing path, and is ejected to the outside of the apparatus, thus suppressing inflow of the air into the stacking section 8 side. Therefore, it is possible to reliably prevent the disadvantage that, when the internal pressure of the air flow path becomes high, air flows into the stacking section 8 side and a stacking failure of the sheet occurs because there is no escape route of the air. In particular s the effect of preventing a stacking failure is large in a high-speed machine in which a sheet interval becomes short.

Furthermore, since the present embodiment does not employ a configuration in which air is blown to the sheet P ejected to the stacking, section 8 from the upper surface side, the disadvantage that the tacking prevention performance becomes worse as the number of stacked sheets increases does not occur. The disadvantage that the ejected sheet easily hangs down and the sheet is curled in the stacking section 8 also does not occur.

Although the embodiment of the present invention has been described above, the present invention is not limited to the above-described embodiment. For example, the above-described embodiment employs the configuration in which the air blower fan 10 is disposed on the lower side of the stacking section 8 and air is blown through the duct 100 below the stacking section 8. However, the position of the air blower fan 10 is not limited to the lower side of the stacking section 8. The air taken in by the air blower fan 10 may pass through the sheet ejection roller pair 71 from above to below. A second air blowing path for suppressing inflow of the air into the stacking section 8 may be formed above the sheet ejection roller pair 71.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. A sheet cooling apparatus comprising:

a fixing device that fixes a toner image on a sheet;

an ejection section that ejects the sheet on which the toner image has been fixed by the fixing, device;

a stacking section that stacks the sheet ejected by the ejection section;

an air blowing device that blows air;

a first air blowing path that guides the air from the air blowing device so that the air passes through the ejection section; and a second air blowing path that guides the air so as to suppress inflow of the air into the stacking section in a state where the first air blowing path is blocked by the sheet ejected by the ejection section.

2. The sheet cooling apparatus according to claim 1, wherein the air blowing device is mounted on the stacking section, and the air blown by the air blowing device passes below the stacking section and is guided to the ejection section by the first air blowing path.

3. The sheet cooling apparatus according to claim 1, wherein in a state where no sheet exists in the ejection section, the first air blowing path guides the air from below to above the ejection section, in a state where the first air blowing path is blocked by the sheet, the second air blowing path guides the air to a side opposite to the stacking section on a lower side of the ejection section, and the air guided by each of the first and second air blowing paths is collected by a suction fan.

4. The sheet cooling apparatus according to claim 3, wherein the air collected by the suction fan is ejected to an outside of the sheet cooling apparatus through a filter.

5. The sheet cooling apparatus according to claim 1, wherein the air blown by the air blowing device is taken in from an outside of an image forming apparatus.

6. The sheet cooling apparatus according to claim 1, wherein the ejection section includes a sheet ejection driven roller that supports a sheet to be ejected, and the air guided to the ejection section by the first air blowing path directly cools the sheet ejection driven roller.

7. An image forming apparatus comprising a sheet cooling apparatus, the sheet cooling apparatus including:

a fixing device that fixes a toner image on a sheet;

an ejection section that ejects the sheet on which the toner image has been fixed by the fixing device;

a stacking section that stacks the sheet ejected by the ejection section;

an air blowing device that blows air;

a first air blowing path that guides the air from the air blowing device so that the air passes through the ejection section; and a second air blowing path that guides the air so as to suppress inflow of the air into the stacking section in a state where the first air blowing path is blocked by the sheet ejected by the ejection section.

* * * * *